US008284390B1

(12) United States Patent
Clasquin et al.

(10) Patent No.: US 8,284,390 B1
(45) Date of Patent: Oct. 9, 2012

(54) VEHICLE TIRE CHANGING SYSTEM WITH TOOL POSITIONING SENSOR

(75) Inventors: Joel Clasquin, Edwardsville, IL (US); Michael D. Gerdes, O'Fallon, MO (US); Douglas Hanneken, St. Louis, MO (US); Nicholas J. Colarelli, III, St. Louis, MO (US)

(73) Assignee: Hunter Engineering Company, Bridgeton, MO (US)

( * ) Notice: Subject to any disclaimer, the term of this patent is extended or adjusted under 35 U.S.C. 154(b) by 457 days.

(21) Appl. No.: 12/106,441

(22) Filed: Apr. 21, 2008

Related U.S. Application Data

(60) Continuation-in-part of application No. 12/022,315, filed on Jan. 30, 2008, now Pat. No. 7,495,755, which is a division of application No. 10/783,609, filed on Feb. 20, 2004, now Pat. No. 7,355,687.

(60) Provisional application No. 60/448,679, filed on Feb. 20, 2003.

(51) Int. Cl.
*G01B 11/26* (2006.01)

(52) U.S. Cl. ............ 356/139.09; 356/139.01; 356/139.1

(58) Field of Classification Search ........ 356/3.01–3.15, 356/4.01–4.1, 5.01–5.15, 6–22, 28, 28.5, 356/139.01–139.09
See application file for complete search history.

(56) References Cited

U.S. PATENT DOCUMENTS

| | | | |
|---|---|---|---|
| 2,731,834 A | 1/1956 | Fehr et al. | |
| 3,076,342 A | 2/1963 | Hilgers | |
| 3,102,429 A | 9/1963 | Hardy et al. | |
| 3,741,016 A | 6/1973 | Hofmann | |
| 4,341,119 A | 7/1982 | Jackson et al. | |
| 4,576,044 A | 3/1986 | Boni | |
| 4,939,941 A | 7/1990 | Celucci et al. | |
| 5,054,918 A | 10/1991 | Downing et al. | |
| 5,189,912 A | 3/1993 | Quinlan et al. | |
| 5,245,867 A | 9/1993 | Sube et al. | |
| 5,396,436 A | 3/1995 | Parker et al. | |
| 5,466,182 A * | 11/1995 | Marangoni | 451/254 |
| 5,789,668 A | 8/1998 | Coe et al. | |
| 5,827,964 A * | 10/1998 | Douine et al. | 73/466 |
| 5,915,274 A | 6/1999 | Douglas et al. | |
| 6,069,966 A | 5/2000 | Jones et al. | |
| 6,122,957 A | 9/2000 | Bux et al. | |
| 6,244,108 B1 | 6/2001 | McInnes et al. | |
| 6,323,942 B1 | 11/2001 | Ramji | |
| 6,396,397 B1 | 5/2002 | Bos et al. | |
| 6,535,275 B2 | 3/2003 | McCaffrey et al. | |
| 6,535,281 B2 | 3/2003 | Conheady et al. | |

(Continued)

FOREIGN PATENT DOCUMENTS

EP 0565320 10/1993

*Primary Examiner* — Luke Ratcliffe
(74) *Attorney, Agent, or Firm* — Polster, Lieder, Woodruff & Lucchesi, L.C.

(57) ABSTRACT

A vehicle tire changing system is configured with sensors to acquire dimensional information associated with tire service tools and a vehicle wheel assembly. The sensors acquire dimensional information associated with at least one feature of the vehicle wheel assembly or a tire service tool. The vehicle tire changing system is configured to utilize the acquired dimensional information to automate and monitor the movement of an associated tire service tool and optionally, to store or convey the acquired dimensional information for use by other vehicle service systems.

29 Claims, 14 Drawing Sheets

U.S. PATENT DOCUMENTS

| | | |
|---|---|---|
| 6,619,362 B2 | 9/2003 | Corghi |
| 6,805,004 B2 | 10/2004 | Corghi |
| 6,886,619 B2 | 5/2005 | Gonzaga |
| 6,982,653 B2 | 1/2006 | Voeller et al. |
| 7,089,987 B2 | 8/2006 | Gonzaga |
| 7,188,656 B2 | 3/2007 | Gonzaga |
| 7,296,351 B2 | 11/2007 | Gonzaga |
| 7,715,024 B2 | 5/2010 | Sotgiu |
| 7,798,196 B2 | 9/2010 | Gonzaga et al. |
| 2002/0017368 A1* | 2/2002 | Corghi .................. 157/1.24 |
| 2004/0050159 A1 | 3/2004 | Corghi |
| 2004/0051864 A1 | 3/2004 | Braghiroli |
| 2004/0165180 A1* | 8/2004 | Voeller et al. ............ 356/139.09 |
| 2005/0052657 A1 | 3/2005 | Braghiroli |
| 2005/0052658 A1 | 3/2005 | Braghiroli |
| 2005/0055153 A1 | 3/2005 | Braghiroli |
| 2005/0132786 A1 | 6/2005 | Cullum |
| 2005/0165509 A1 | 7/2005 | Braghiroli |

* cited by examiner

VEHICLE TIRE CHANGING SYSTEM WITH TOOL POSITIONING SENSOR

CROSS-REFERENCE TO RELATED APPLICATIONS

The present application is a continuation in-part of, and claims priority from, U.S. patent application Ser. No. 12/022,315 filed on Jan. 30, 2008, which claims priority from, and is a divisional of, U.S. patent application Ser. No. 10/783,609 filed on Feb. 20, 2004 now U.S. Pat. No. 7,355,687, which in turn is related to, and claims priority from, U.S. Provisional Patent Application Ser. No. 60/448,679 filed on Feb. 20, 2003. Both the '609 and '679 applications are herein incorporated fully by reference.

STATEMENT REGARDING FEDERALLY SPONSORED RESEARCH

Not Applicable.

BACKGROUND OF THE INVENTION

The present invention related generally to automotive service equipment adapted for the servicing of vehicle wheel assemblies, and specifically to automotive tire changing equipment utilizing positioning and imaging sensors to measure distances, dimensions, and characteristics when servicing a vehicle wheel assembly, and to automate the positioning and movement of the vehicle wheel assembly and associated tools.

Typically, tire changers or tire mounting and dismounting systems utilize manual tool positioning systems in which the operator observes the tire and wheel assembly mounted on the tire changer support structure, and manual positions any associated tire service tools, such as a bead breaker arm, based on prior knowledge of the proper methods for servicing a tire. The act of positioning the tire service tool may require a physical action by the operator, such as pulling a lever or sliding a shaft, or the operator may push a button or operate a joystick-type lever for tools which are pneumatically or hydraulically actuated. Either way, the operator is required to exercise judgment to properly place the tire service tools. Hence, the operator may fail to place the tire service tools in their optimum locations as is required for proper functionality and to reduce the chances for wheel damage, tire damage, and tire changer damage.

Accordingly, it would be advantageous to provide a vehicle tire mounting (changing) system with sensors configured to acquire dimensional information associated with a vehicle wheel assembly undergoing service, and to utilize the acquired dimensional information to assist in completing a vehicle wheel service procedure by facilitating automated movement of the wheel assembly and associated tire service tools.

BRIEF SUMMARY OF THE INVENTION

Briefly stated, the present disclosure provides a vehicle tire changing system configured with sensors to acquire dimensional information associated with tire service tools and a vehicle wheel assembly consisting of at least a vehicle wheel rim onto which a tire is to be mounted, dismounted, or repositioned. The sensors acquire dimensional information associated with at least one feature of the vehicle wheel assembly, including, but not limited to, rim diameter, radial runout of the rim bead seat surfaces, lateral runout of the wheel rim, tire characteristics and defects, wheel rim surface defects, wheel rim configurations and profiles, and the presence of installed tire pressure sensors. The vehicle tire changing system is further configured to utilize the acquired dimensional information to automate and monitor the movement of a tire service tool, such as a wheel assembly handling tool or bead breaker arm, to assist an operator in completing a tire mounting, dismounting, or repositioning procedure, and optionally, to store or convey the acquired dimensional information for use by a vehicle wheel balancing system in a subsequent wheel balancing procedure associated with the vehicle wheel assembly.

In an embodiment of the present invention, the sensors utilized by the vehicle tire changing system include at least one imaging sensor assembly configured to acquire optical images of the vehicle wheel assembly. The acquired optical images are processed by a processing unit associated with the vehicle tire changing system to identify the dimensional information associated with at least one feature of the vehicle wheel assembly.

In an embodiment of the present invention, the sensors utilized by the vehicle tire changing system include at positional sensor associated with a dataset arm which is configured to engage or contact surfaces of the vehicle wheel assembly. Movement and positioning of the dataset arm to contact surface of the vehicle wheel assembly is observed by the positional sensor and monitored by a processing unit associated with the vehicle tire changing system to identify the dimensional information associated with at least one feature of the vehicle wheel assembly.

In an embodiment of the present invention, the sensors utilized by the vehicle tire changing system include at positional sensor associated with a tire service tool configured to engage or contact surfaces of the vehicle wheel assembly. Movement and positioning of the tire service tool to engage or contact surface of the vehicle wheel assembly is observed by the positional sensor and monitored by a processing unit associated with the vehicle tire changing system to provide feedback for directing automated movement and positioning of the tire service tool.

The foregoing and other objects, features, and advantages of the apparatus and methods of the present invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

The present invention is described below in the context of an improved vehicle tire changing system, configured with measurement sensors for determining spatial positioning data associated with a vehicle wheel assembly consisting of a wheel rim and any installed tire, secured to the vehicle tire changing system for service, as well as with measurement sensors for determining spatial positioning data associated with one or more actuated tire service tools utilized in the service of the vehicle wheel assembly.

Figure 1:
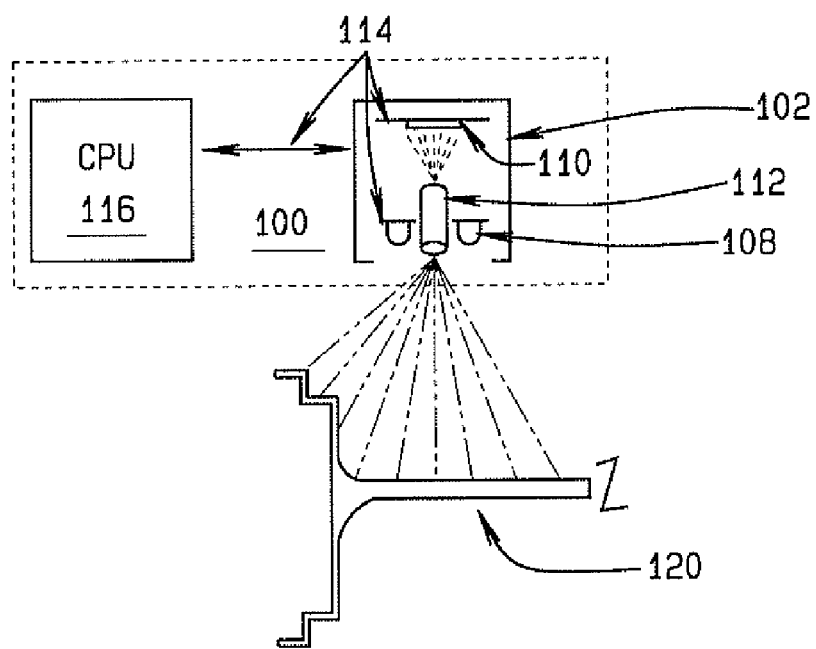
FIG. 1 illustrates a preferred camera component configuration of the present invention.
Figure 2:
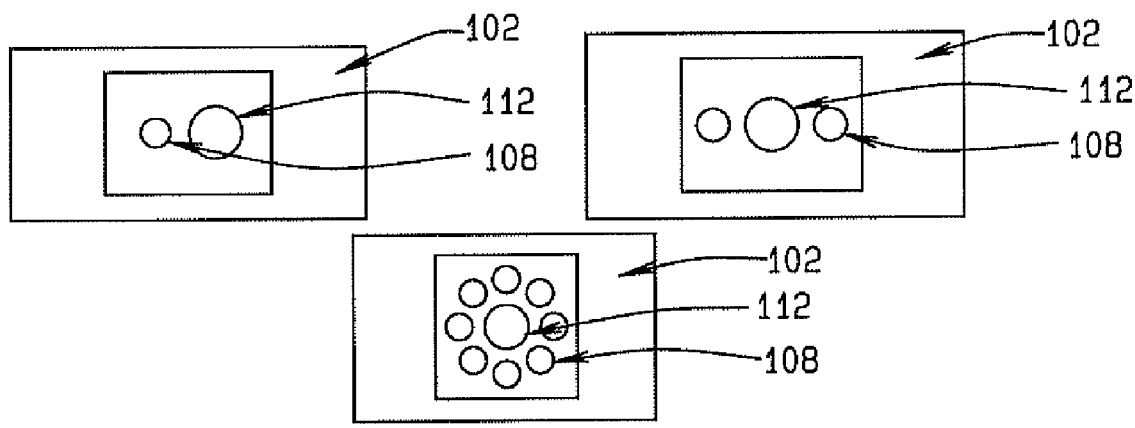
FIG. 2 illustrates alternate camera component configurations of the present invention.

Turning to FIGS. 1 and 2, one type of measurement sensor which may be utilized with the tire changing system 400 for determining spatial positioning data consists of an imaging sensor assembly 102 configured to acquire one or more images of a field of view. The acquired images are processed to locate, measure distances to, dimensions of, and to identify features or target objects, particularly vehicle wheel assembly features, vehicle wheel feature locations, vehicle wheel configurations, dimensions, and associated distances. For example, an imaging sensor assembly 102 may be disposed to provide data for determining a distance measurement to a tread surface of a tire, a wheel rim bead seat or lip, identifying tire flat spots, bulges, or providing a measure of the tire tread depth.

As shown in FIG. 1, an imaging sensor assembly 102 preferably consists of an optical energy source 108 configured to emit optical energy at a known wavelength, an imaging sensor 110, and a lens assembly 112 configured to focus reflected optical energy onto the imaging sensor 110. The imaging sensor 110 is preferably a two-dimensional array of light sensing elements configured to generate a signal representative of distances between each sensing element and a feature or target object in addition to a signal representative of the optical energy received at each sensing element (i.e., an image consisting of discrete pixels corresponding to each sensing element in the image sensor 110).

Two or more imaging sensor assemblies 102 may be utilized in conjunction to acquire multiple images of a common target object for purposes of stereoscopic distance measurements. For such embodiments, each imaging sensor 110 may be a conventional two dimensional array of light sensing elements configured to generate a signal representative only of the optical energy received at each sensing element (i.e., an image).

As illustrated in FIG. 2, the imaging sensor assembly 102 may be configured in a variety of different configuration, depending upon the particular application for which each will be utilized. Preferably, each optical energy source 108 associated with a particular imaging sensor assembly 102 is configured to emit optical energy at the same wavelength. If multiple imaging sensor assemblies 102 are employed in a single vehicle service device 100, the optical energy sources 108 associated with each imaging sensor assembly 102 may be configured to emit optical energy at different wavelengths, to facilitate distinguishing reflected light between each imaging sensor assembly 102.

Each imaging sensor assembly 102 further includes a conventional communication means 114 to transfer captured images and distance data to a processing unit 116, such as a central processing unit, a microprocessor, or other suitable logic circuit associated with the vehicle tire changing system 400. Optionally, image processing may be done in a sensor logic circuit associated with the imaging sensor assembly 102, and the communication means 114 configured to transfer the resulting processed data along with, or instead of, the raw image data to the processing unit 116.

When associated with vehicle tire changing system 400, the imaging sensor assembly 102 may be located in a variety of different locations depending upon the particular application for which the imaging sensor assembly 102 is to be utilized, operating parameters of the imaging sensor assembly 102, including but not limited to durability, stability, focal length of the lens 112, Field Of View (FOV) of the lens 112, intensity of optical energy emitted from the optical energy source 108, and limitations of the imaging sensor 110.

Figure 3A:
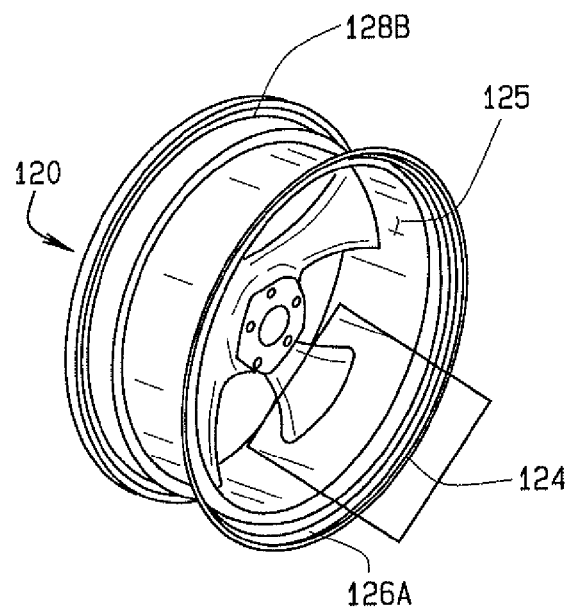
FIG. 3A illustrates an inner view of a vehicle wheel rim.
Figure 3B:
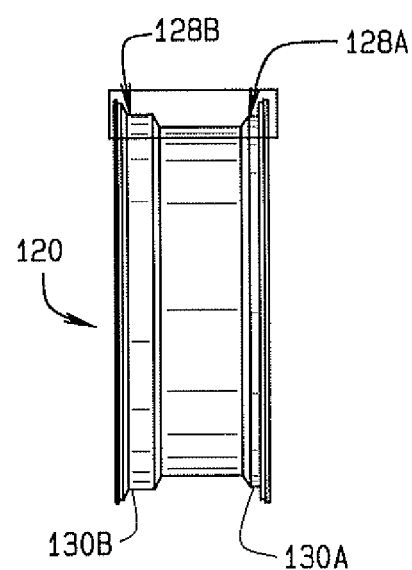
FIG. 3B illustrates a side view of a vehicle wheel rim.
Figure 3C:
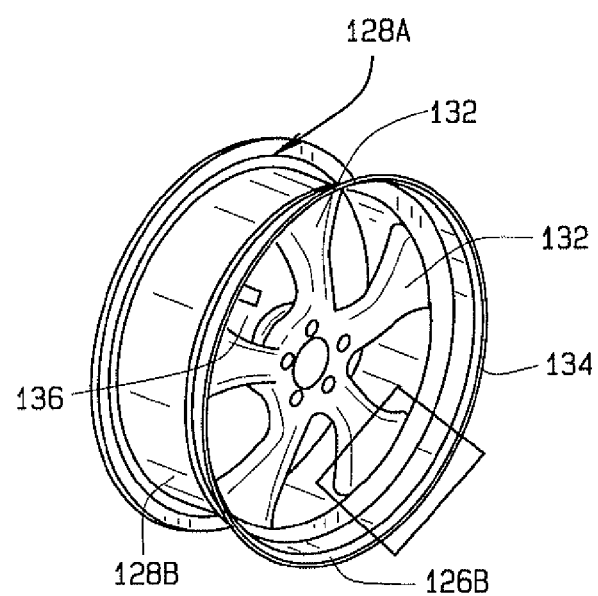
FIG. 3C illustrates an outer view of a vehicle wheel rim.

For applications which require the imaging sensor assembly 102 to view a vehicle wheel assembly 118, consisting of a wheel rim 120 and tire 122, there are a variety of surfaces on the vehicle wheel assembly 118 which are of interest. For example, as shown in FIGS. 3A through 3C, with a tire 122 mounted or dismounted, it is desirable to include in a field of view, the inner and outer wheel rim lips 124, 134 the inner surface profile 125 of the wheel rim 120, and the underside 126A of the inner tire bead seat 128A. It may be further desirable to include in a field of view, the upper surfaces 130A, 130B of the inner and outer tire bead seats 128A, 128B with the tire 122 removed or dismounted, as well as the spokes 132 of the wheel rim 120. The outer portions of the wheel rim 120 may optionally be viewed to locate other features such as a valve stem 136 or temporary index markings so that the wheel assembly 118 may be rotated to a convenient location for inflation or to automatically re-phase the wheel rim 120 and tire 122 during a mounting procedure.

For any field of view including a portion of a vehicle wheel assembly 118 acquired by a camera or image assembly 102, obstructions to the smooth surfaces of the wheel rim 120 such as balance weights (not shown), spokes 132, or valve stems 134, may be identified in resulting images utilizing conventional image processing techniques.

Figure 4:
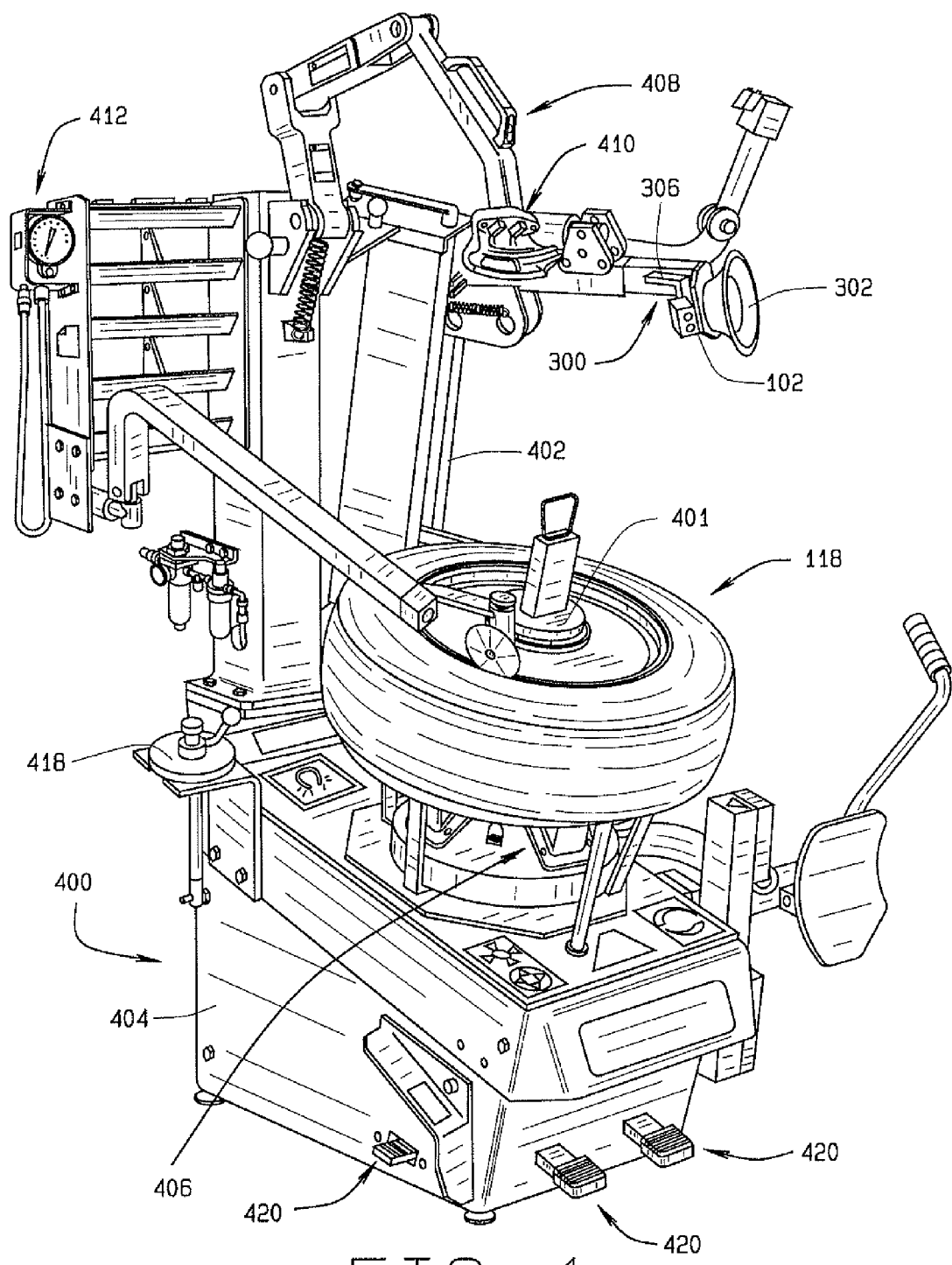
FIG. 4 is a perspective view of a tire changing system incorporating a dataset measurement arm.

One suitable location for an imaging sensor assembly 102 to view the surfaces of a vehicle wheel rim 120 as illustrated in FIG. 3B is on a tire bead removal arm 300 as shown in FIG. 4, associated with the vehicle tire changing system 400. A tire bead removal arm 300 consists of tire bead breaker or bead roller 302 disposed for rotational movement at an end of an articulating support structure 304. The articulating support structure 304 is typically configured with mechanical, hydraulic, or pneumatic actuating mechanism (not shown) to engage the bead roller 302 with the side surface of a tire 122 disposed on a wheel rim 120, disengaging the tire 122 from the wheel rim bead seat 128A. Typically, a second tire bead removal arm is disposed adjacent an opposite side of the tire 122, to displace the opposite tire surface from the wheel rim bead seat 128B.

As illustrated in FIG. 4, an imaging sensor assembly 102 associated with the tire bead removal arm 300 is preferably coupled thereto by means of a bracket 306 which positions the imaging sensor assembly 102 adjacent the bead roller 302. In this configuration, the imaging sensor assembly 102 is provided with a field of view which includes the upper surface of the wheel rim bead seat 128A as the bead roller 302 displaces the tire 122. Typically, a bead roller 302 will displace a tire 122 two or more inches from the bead seat 128A. Continuous rotation of the wheel assembly 118 about the wheel axis as the bead roller 302 displaces the tire 122 from the circumference of the bead seat 128A provides an imaging sensor assembly 102 disposed with the proper field of view, a complete view of the entire circumferential surface of the bead seat 128A or 128B from which distance measurements can be acquired.

During operation, once the tire bead removal arms 300 have unseated the tire 122 from the bead seat surfaces 128A, 128B, the imaging sensor assembly 102 is utilized to acquire distance information corresponding to measurement of the exposed wheel rim bead seat surfaces 128A, 128B. For example, as previously described, an imaging sensor assembly 102 associated with the tire bead removal arms 300 can obtain images of the bead seat surfaces 128A, 128B from which distance information can be extracted, identifying the presence of radial or lateral runout.

Figure 5:
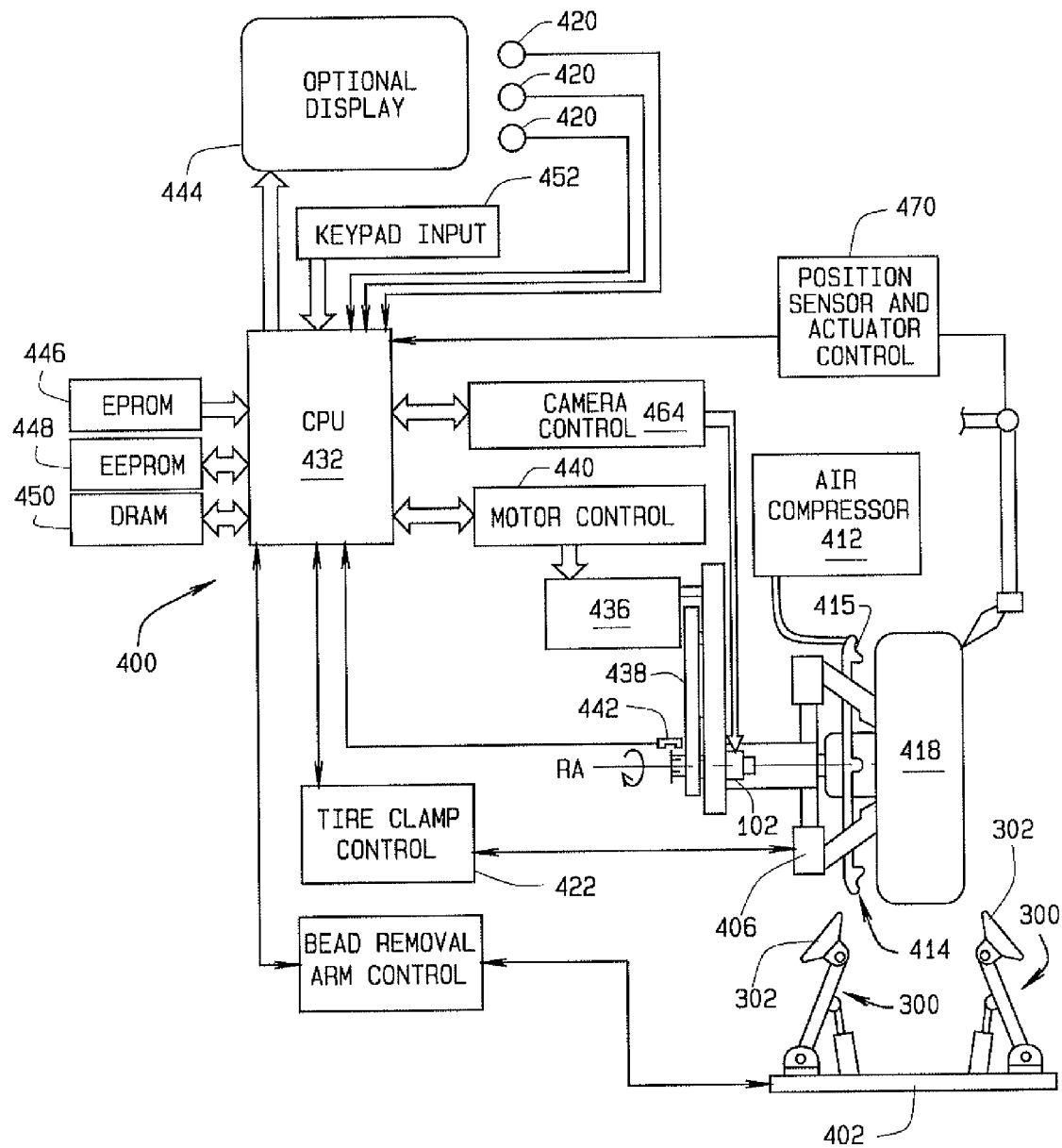
FIG. 5 is a block diagram illustrating the interactive components of a tire changing system of the present disclosure.

Preferably, as illustrated in FIGS. 4 and 5, the tire bead removal arms 300 are coupled to a bead roller assembly 402 secured to the base 404 of the tire changer system 400. A tire clamping device 406 is additionally disposed on the base 404, and is configured to secure a wheel assembly 118 in a generally horizontal position between the upper and lower tire bead removal arms 300. An articulating tire mount/demount arm assembly 408 is further coupled to the base 404, and includes a tire mount/demount head 410 configured to assist in installation or removal of a tire 122 from a wheel rim 120. A number of conventional accessory items such as a compressed air inflation assembly 412, tire air inflation ring 414, a wheel centering support 416, and removable wheel securing device 418 are associated with the tire changer system 400. Similar, a number of foot activated control pedals 420 are provided.

For some tire and rim combinations it is necessary for the tire changer system 400 to use a high pressure blast of air from the tire air inflation ring 414 between the rim 120 and the tire 122 to assist in seating the tire 122 on the bead seat surfaces 128A, 128B. The blast of air causes the tire sidewalls to expand such that the tire 122 makes a seal with the wheel rim 120 close to, if not on, the bead seat surfaces 128A, 128B. This is necessary for filling the wheel assembly 118 with air until the tire 122 is seated into the bead seat surfaces 128A, 128B. The imaging sensor assembly 102 is optionally utilized to acquire one or more dimensional measurements of the vehicle wheel rim 120 which are subsequently utilized by the tire changer system 400 to determine a need for an air blast, and to alter the position or orientation of the individual nozzles 415 on the tire air inflation ring 414 to accommodate wheel rims 120 of different sizes.

In the tire changing system 400, the vehicle wheel assembly 118 to be dismounted or mounted may be secured on a rotating shaft 401 by a set of wheel clamps 406. The shaft 401 is driven by a motor drive 436 through a belt 438. Operation of the motor drive 436 is controlled by a motor control unit 440, in response to signals received from the CPU 432. The CPU 432 similarly controls the operation of the wheel clamps 406 through a tire clamp control unit 433. Mounted on one end of the shaft 401 is a conventional shaft encoder 442 which provides rotational position information to the tire changer CPU 432. The CPU 432 is preferably capable of executing tire changer operations software and driving an optional display 444. The CPU 432 is connected to EPROM program memory 446, EEPROM memory 448 for storing and retrieving non-volatile information such as vehicle wheel specific specifications, and DRAM memory 450 for temporary storage. Manual inputs for the present invention may entail a keypad entry 452 as well as control pedals 420.

Additionally shown in FIG. 5 is the inclusion of camera control logic 464 in communication with the tire changer CPU 432 for controlling the operation of an imaging sensor assembly 102. The imaging sensor assembly 102 is preferably disposed with a field of view towards a portion of the wheel assembly 118 mounted on the shaft 401, such that the imaging sensor assembly 102 can acquire images of the tire and rim surfaces.

Optionally, the CPU 432 of the tire changer system 400 is further configured to communicate with one or more additional vehicle services devices, such as a vehicle wheel balancer 200, to exchange data therewith. For example, the tire changer system 400 may be configured to communicate one or more radial runout measurements acquired by the imaging sensor assembly 102 for a wheel assembly 118 to a vehicle wheel balancer system 200 for use during a subsequent balancing procedure of that wheel assembly 118. Alternatively, the tire changer system 400 may be configured to store the acquired measurements or images either locally in an associated data storage 450, remotely over a data network, or in an data storage device associated with the wheel assembly 118 itself such as an radio-frequency identification device (not shown) which can be later accessed by another vehicle service device to retrieve the information.

Providing a vehicle tire changing system 400 with one or more tire bead removal arms 300 configured with an associated imaging sensor assembly 102 facilitates automation of the tire bead seat breaking process by utilizing images and distance measurements obtained from the imaging sensor assembly 102 to locate the tire bead removal arms 300 relative to the wheel assembly 118, and in particular, to locate bead rollers 302 relative to the junction between the tire 122 and wheel rim 120. The images and distance measurements acquired from the imaging sensor assembly 102 may provide feedback to be utilized by the vehicle tire changing system 400 to control movement of the pair of tire bead removal arms 300, and to guide the bead rollers 302 into the appropriate junction for displacement of the tire 122 from the bead seat surfaces 128A, 128B. Once the bead rollers 302 are positioned, the imaging sensor assembly 102 is utilized along with conventional location and pressure sensors associated with the tire bead removal arms 300 to unseat the tire 122 from the rim bead seat surfaces 128A, 128B.

Figure 6:
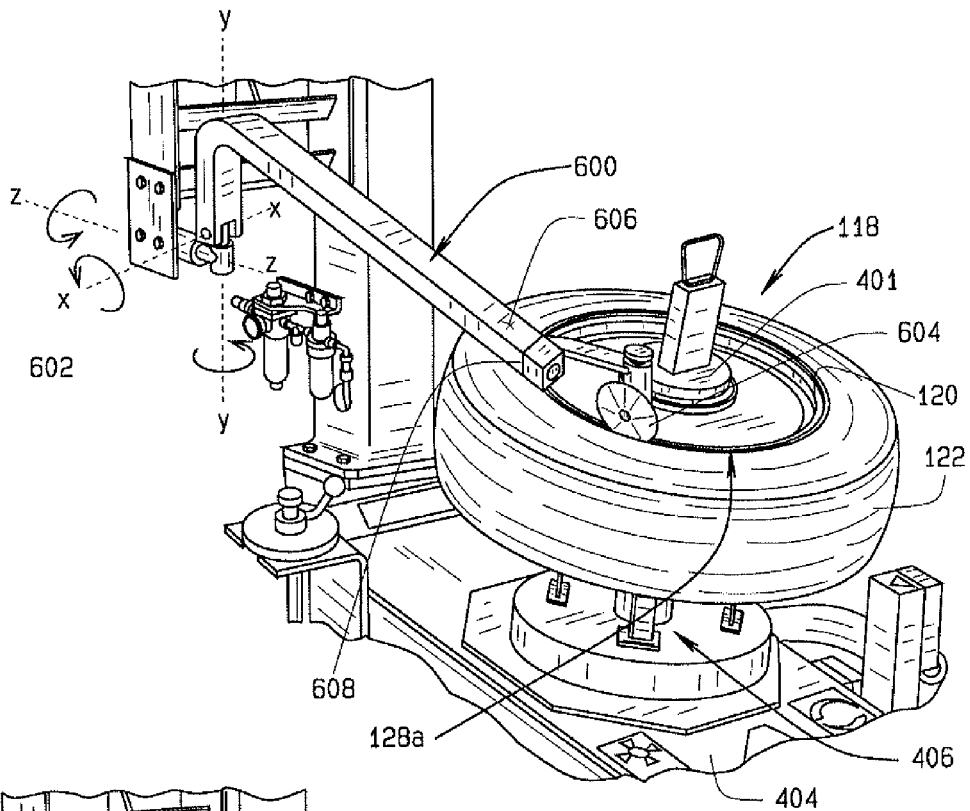
FIG. 6 is a perspective illustration of the dataset measurement arm of FIG. 4 in use on the outer rim lip of a wheel rim and tire assembly mounted to the tire changing system.
Figure 7:
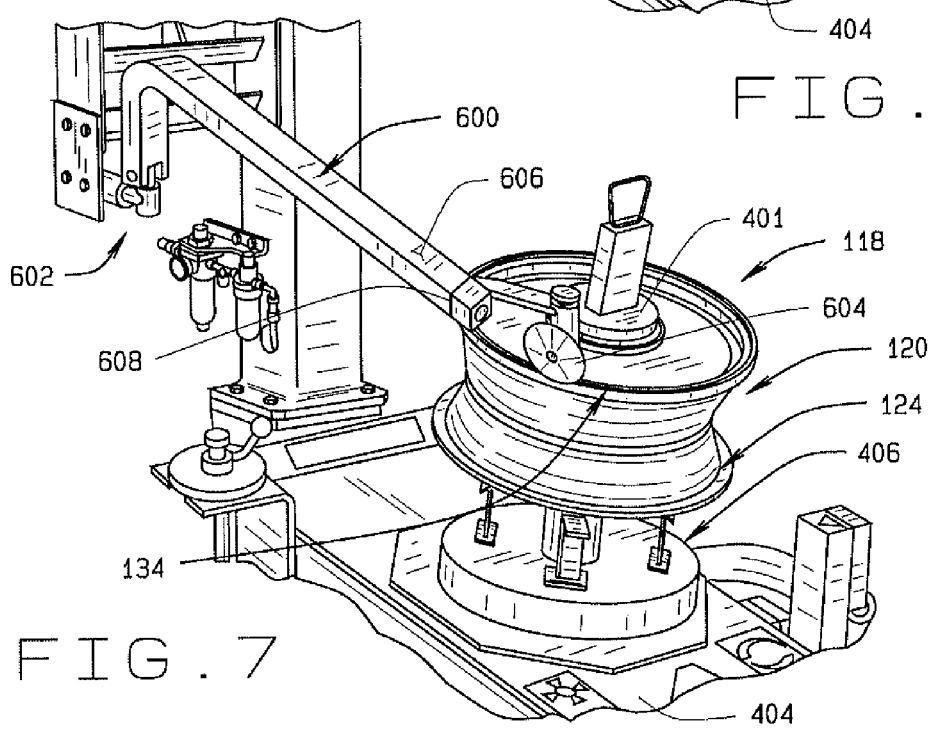
FIG. 7 is a perspective illustration of the dataset measurement arm of FIG. 4 in use on the outer lip of a wheel rim mounted to the tire changing system.
Figure 8:
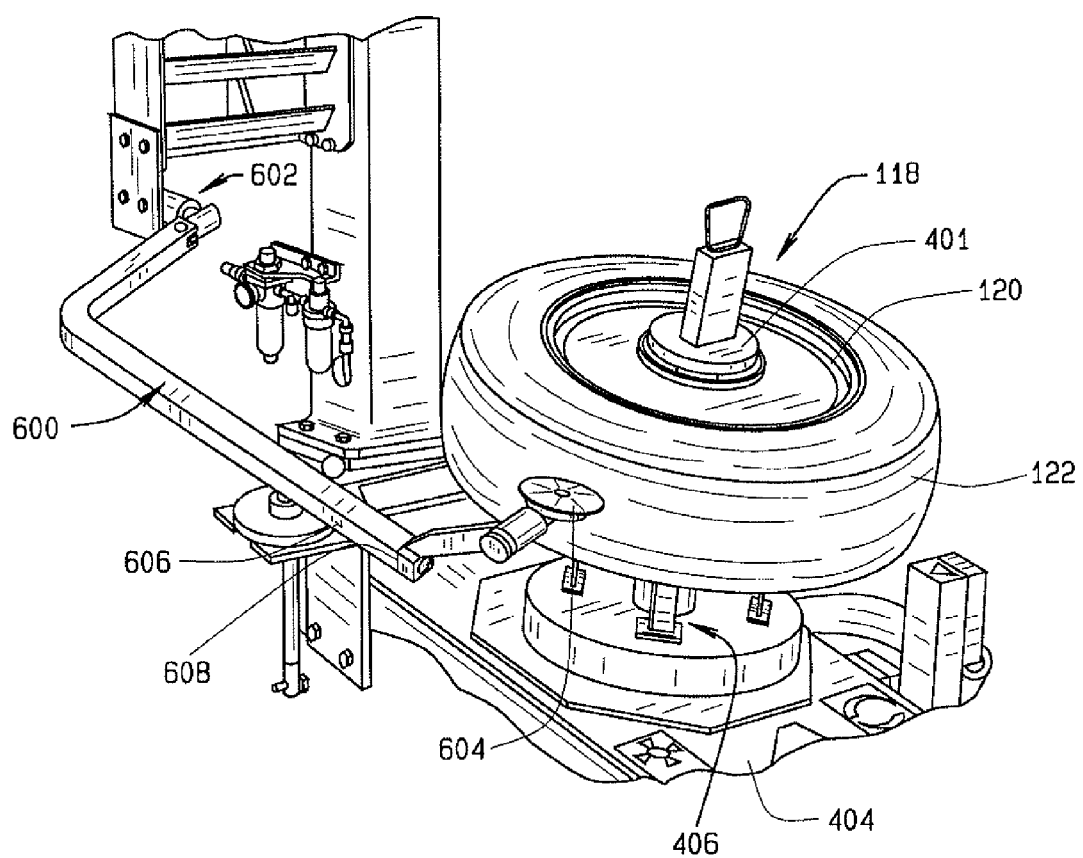
FIG. 8 is a perspective illustration of the dataset measurement arm of FIG. 4 in use on the outer diameter of a wheel rim and tire assembly mounted to the tire changing system.
Figure 9:
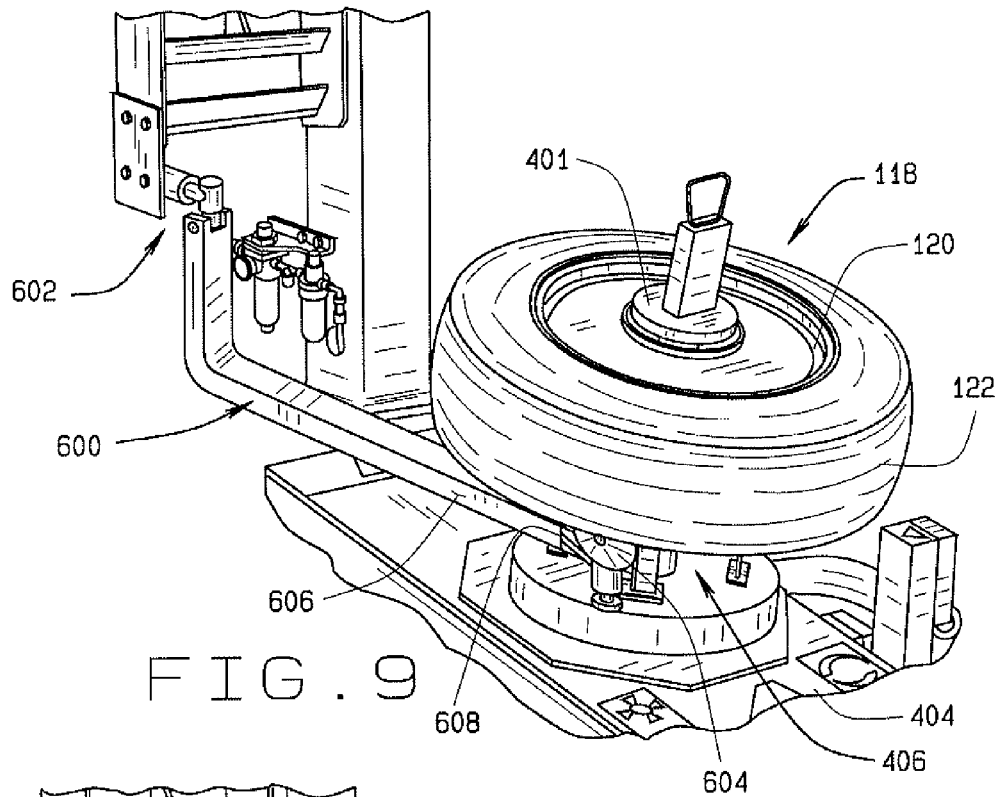
FIG. 9 is a perspective illustration of the dataset measurement arm of FIG. 4 in use on the inner bead seat of a wheel rim and tire assembly mounted to the tire changing system.
Figure 10:
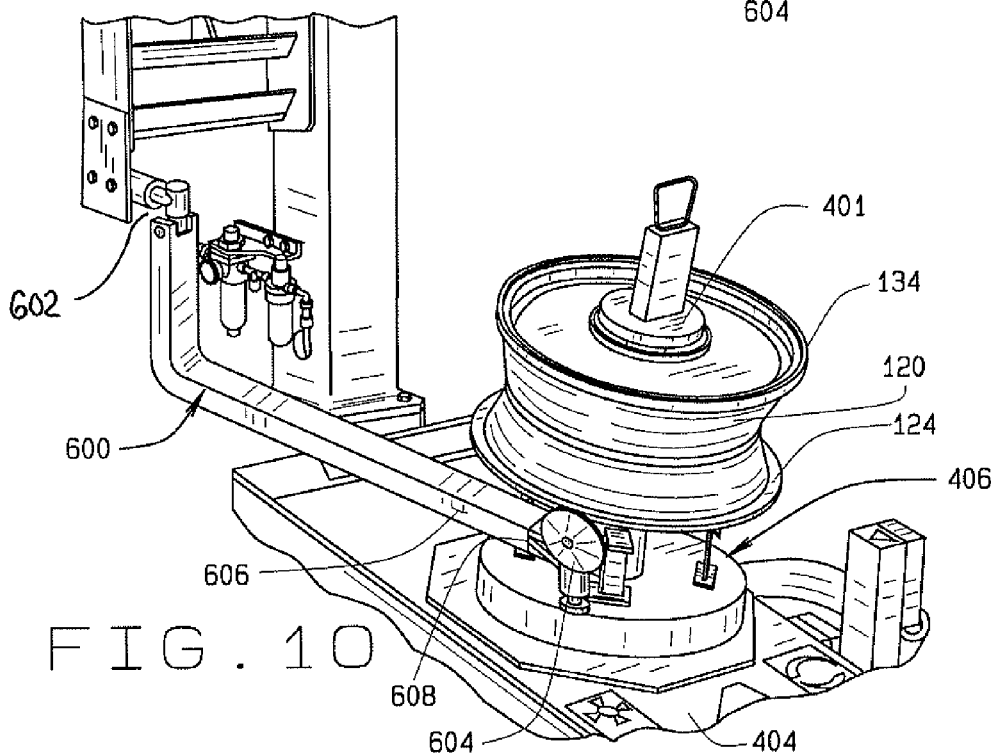
FIG. 10 is a perspective illustration of the dataset measurement arm of FIG. 4 in use on the inner lip of a wheel rim mounted to the tire changing system.

In an alternate embodiment, measurement sensors for measuring movement of mechanical components are associated with the articulating features of a mechanical dataset arm 600, such as shown in FIGS. 6 through 10. The mechanical dataset arm 600 incorporates one or more multi-axis joints 602 which can pivot about associated X, Y, and Z-axis, enabling an extendible contact probe 604 disposed on a distal end of the dataset arm 600, to be moved into contact with a variety of surfaces and points on a vehicle wheel 120 and tire 122 assembly. The extendible contact probe 604 is configured to extend linearly from the main portion 606 of the dataset arm via an extension coupling 608. These surfaces and points which the probe may be moved into contact with for measurement purposes may include, but are not limited to, an outer (upper) bead seat 128A of a vehicle wheel 120 and tire 122 assembly as shown in FIG. 6, an outer (upper) rim lip 134 as shown in FIG. 7, an outer diameter of the tire 122 as shown in FIG. 8, an inner (lower) bead seat 128B of a vehicle wheel 120 and tire 122 assembly as shown in FIG. 9, and an inner (lower) rim lip 124 as shown in FIG. 10. By predetermining the specific dimensions of the mechanical dataset arm 600 and the contact probe 604, movement of the dataset arm 600 to bring the contact probe 604 into position to contact a surface of the wheel and tire assembly may be measured by suitable sensors disposed in each multi-axis joint 602. Those of ordinary skill in the art will recognize that the specific type of measurement sensors associated with each multi-axis joint 602, if more than one are present, and each extension coupling 608, if more than one are present, may be varied, provided that movement at the joint (i.e. rotary movement such as axial rotation, or axial movement such as extension and retraction) is monitored to the required degree of precision necessary for conducting service on the wheel and tire assembly.

Data from the various measurement sensors associated with the dataset arm is communicated to the CPU 432 of the vehicle tire changing system 400, and processed to determine three-dimensional positional and/or orientation information associated with the position of the contact probe 604. Using conventional spatial mapping techniques, the measured position of the contact probe 604, when in guided into contact with a desired target surface by an operator, may be referenced to a known spatial position, providing relative measurement data. For example, by comparing the measured position of the contact probe 604 with a predetermined point on an axis of shaft 401 about which the vehicle wheel assembly is supported, a radial dimension and spatial position of the vehicle wheel rim 120 may be identified. Similarly, a radial dimension and spatial position of a rim and tire interface may be identified. The CPU 432 may evaluate multiple measured positions of the contact probe 604 to determine additional dimensional and spatial data associated with the secured vehicle wheel assembly 118, for example, the wheel rim width (i.e., the distance between the inner and outer rim edges 124 and 134.

Those of ordinary skill in the art will recognize that while the contract probe 604 show in the Figures has a generally circular shape and configuration, the specific form of the contract probe may be varied, and that the contact probe 604 may be constructed in any of a variety of configurations and sizes as deemed most suitable for acquiring desired three-dimensional position and/or orientation information. For example, the contact probe 604 may have either a ball, rod, or pointer configuration.

The determined dimensional and spatial data associated with the secured vehicle wheel assembly 118 may be subsequently utilized by the CPU 432 in substantially the same manner as described above in connection with dimensional and spatial data determined from image data acquired by an imaging sensor 102. In particular, the CPU 432 may be configured with suitable operating instructions to utilize the determined dimensional and spatial data for purposes of directing and/or controlling movement of automated articulating tire service tools, such as the tire bead removal arms 300 and/or the articulating tire mount/demount arm assembly 408.

It will be further recognized that a suitable operator interface or keypad 452 may be provided to permit an operator to manually enter dimensional and spatial data associated with the secured vehicle wheel assembly 118 for use by the CPU 432 in substantially the same manner as described above in connection with dimensional and spatial data determined from image data acquired by an imaging sensor 102 or directly by a dataset arm. In particular, the CPU 432 may be configured with suitable operating instructions to utilize the manually entered dimensional and spatial data for purposes of directing and/or controlling movement of automated articulating tire service tools, such as the tire bead removal arms 300 and/or the articulating tire mount/demount arm assembly 408.

Figure 11:
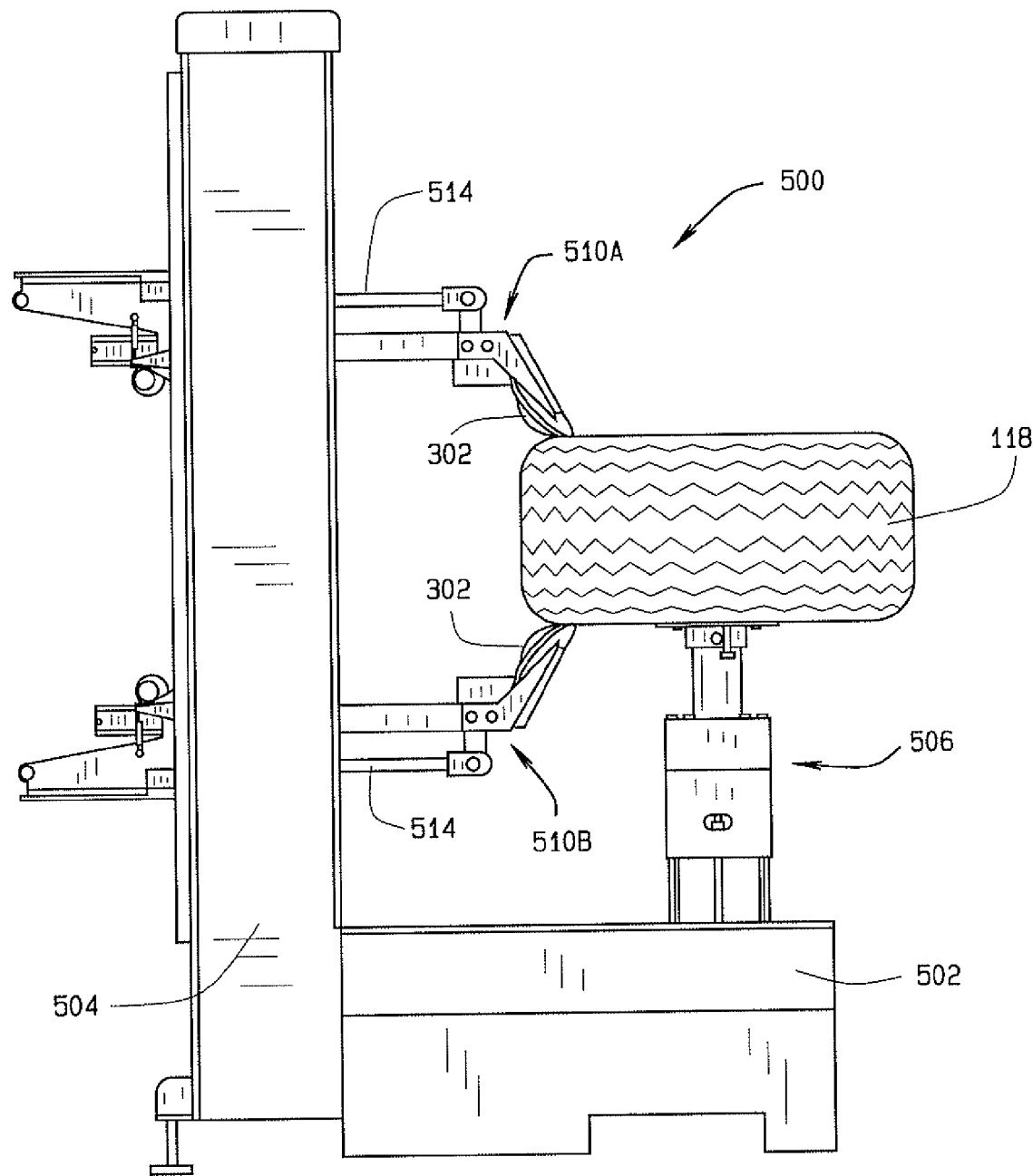
FIG. 11 is a side view of a tire changing system incorporating automated upper and lower bead breaker arms.
Figure 12:
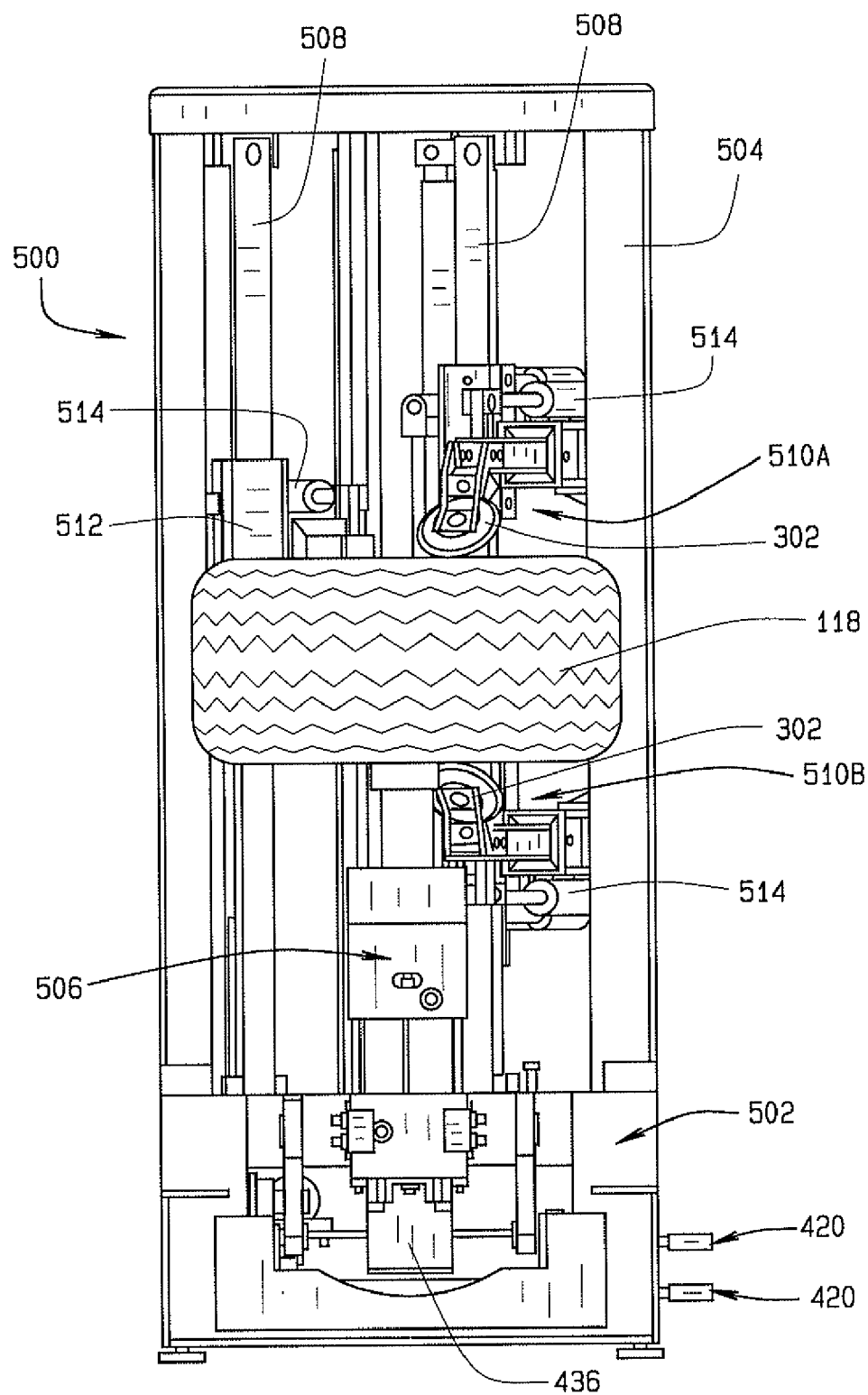
FIG. 12 is a front view of the tire changing system of FIG. 11.
Figure 13:
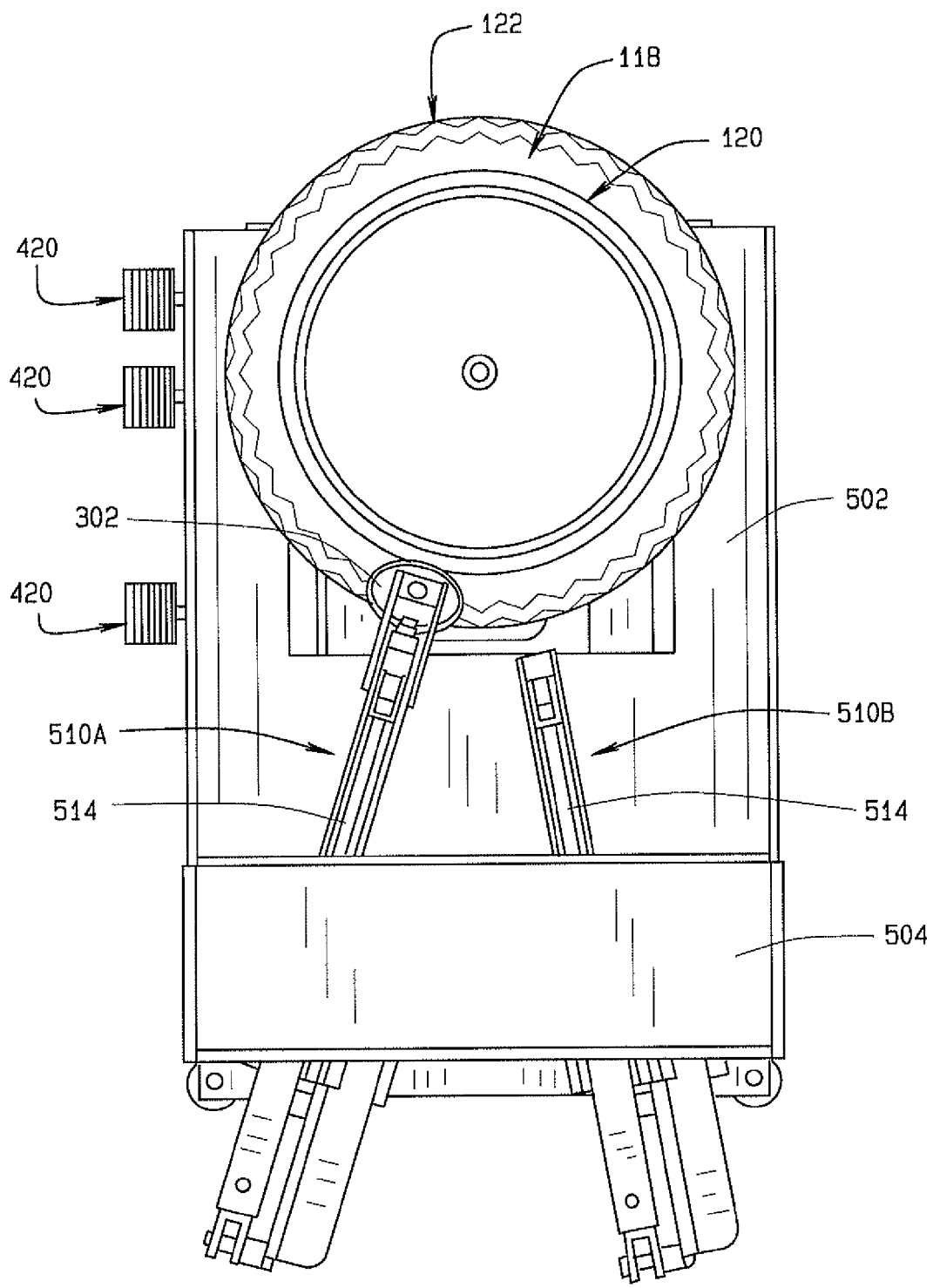
FIG. 13 is a top view of the tire changing system of FIG. 11.
Figure 14:
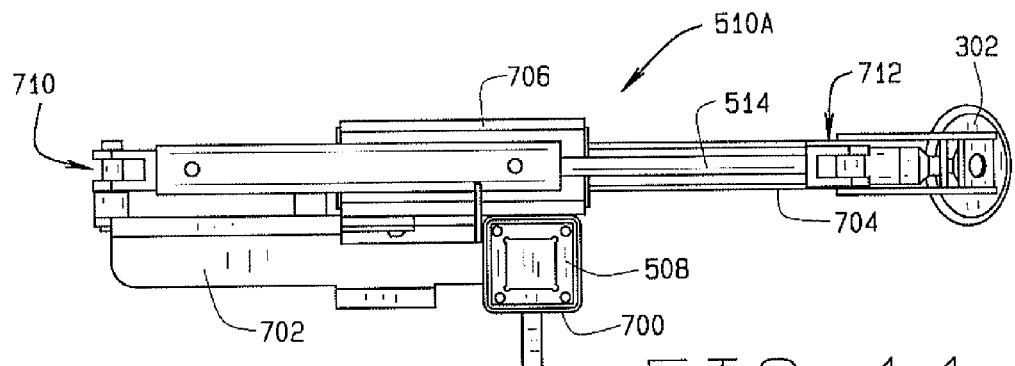
FIG. 14 is a top plan view of an automated bead breaker arm incorporating a position sensor.
Figure 15:
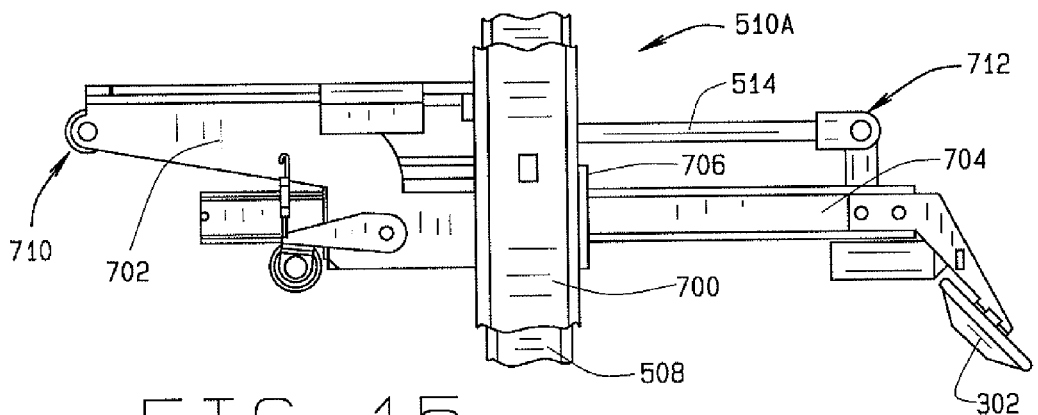
FIG. 15 is a side plan view of the automated bead breaker arm of FIG. 14.
Figure 16:
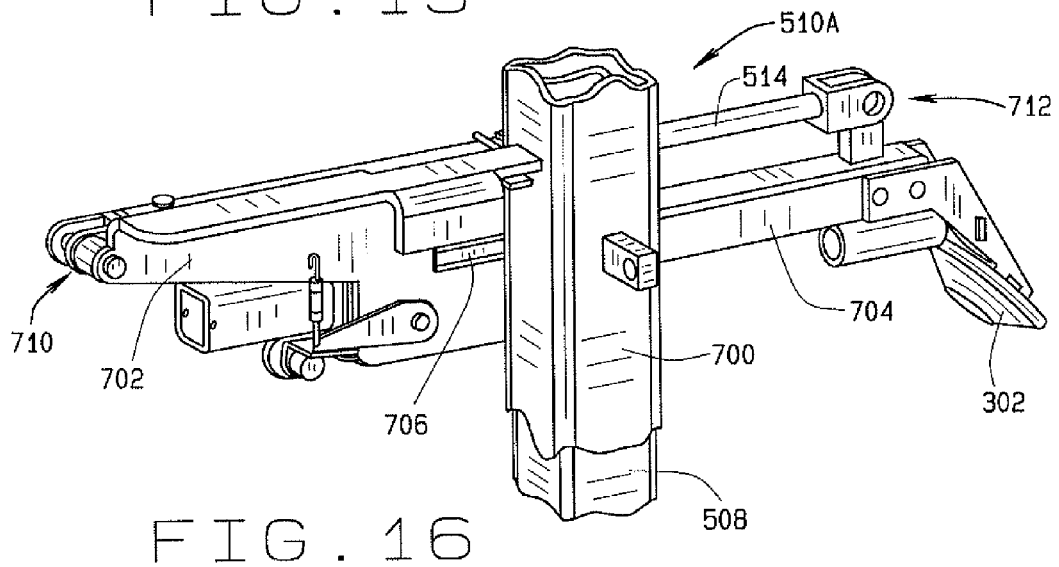
FIG. 16 is a perspective view of the automated bead breaker arm of FIG. 14.

Turning to FIG. 11 through FIG. 13, an embodiment of a vehicle tire changing system 500, which varies in structural configuration from the vehicle tire changing system 400 shown in FIG. 4, is shown. The vehicle tire changing system 500 consists generally of a base 502, and a tire service tool support structure 504. The base encloses various mechanical and electrical components, such as the CPU 432, drive motors, 436, control components, etc. such as shown in FIG. 5 and previously described. The base 502 further supports a wheel assembly support shaft 506 and associated wheel assembly holding components configured to secure a wheel assembly 118 during a service procedure.

The tire service tool support structure 504 incorporates one or more vertical support columns 508 on which automated and articulating vehicle tire service tools, such as upper and lower tire bead removal arms 510A and 510B, and an articulating tire mount/demount arm assembly 512 are operatively carried. Each tire bead removal arm 510A and 510B is configured for vertical movement about an associated support column 508. The vertical movement may be driven by any suitable means, including mechanically, pneumatically, or hydraulically. Movement of the tools about a vertical axis is monitored by means of one or more suitable movement sensors, and feedback signals are provided to the CPU 432 from which the current position of each tire bead removal arm 510A and 510B is determined, enabling closed-loop positioning and control of the tool position by the CPU 432.

Each articulating and automated tire service tool, such as the upper and lower tire bead removal arms 510A and 510B, and the articulating tire mount/demount arm assembly 512, incorporates a sufficient number of movement sensors to accurately monitor all permissible movements of the tool to a desired level of precision. For example, in addition to monitoring vertical movement about the vertical axis of the tool support shaft 506, each tire bead removal arm 510A and 510B further includes at least one additional sensor configured to monitor horizontal extension and retraction of the removal arms as the bead rollers 302 are moved into operative engagement with a wheel assembly 118 supported on the shaft 506. Similar sensors are incorporated into the articulating tire mount/demount arm assembly 512 to monitor horizontal extension and retraction of the tire mount/demount head 410 as it is moved into operative engagement with a wheel assembly 118. Movement of the various tire service tools is monitored by means of one the various sensors, and feedback signals are provided to the CPU 432 from which the current position of each tire service tool is determined, enabling closed-loop positioning and control of the tool position by the CPU 432.

It will be understood that the various sensors may be operatively coupled to the tire service tool external surfaces, in a traditional configuration, or may be enclosed within actuator mechanisms 514 which drive the articulation of the tire service tools. Exemplary sensors include LVDT sensors, optical slides, magnetic slides, potentiometers, hall effect sensors and resistive sensors incorporated into actuators, such as the Polyslide IST actuator assembly produced by the Polygon Company, which incorporates resistive sensing components within a laminate tube to provide data feedback associated with movement of the actuator. Any suitable communications pathway may be utilized to communicate sensor output signals to the CPU 432 during operation of the vehicle tire changing system 500, including sensor cables or wireless communications.

Turning to FIG. 14 through FIG. 18, various views of a tire service tool, and in particular, tire bead removal arm 510A are shown. Tire bead removal arm 510B, is not shown, but is essentially a mirror image of tire bead removal arm 510A. The tire bead removal arm 510A is secured about the tool support shaft 508 by a sliding member 700. The sliding member 700 is adapted for vertical sliding movement about the tool support shaft, and consists generally of a tubular segment having a rectangular cross-section matching the cross-sectional configuration of the tool support shaft, which passes axially there through. A housing framework 702 is secured to an external surface of the sliding member 700, and provides attachment points for an extendible arm 704 carrying the bead roller 302. The extendible arm 704 is secured for generally horizontal axial movement perpendicular to the vertical axis of the tool support shaft 502 within a sleeve 706 mounted to the housing framework 702. An actuation mechanism 514 for moving the extendible arm 704 is secured between a first connection point 710 on the housing framework 720, and a second connection point 712 on the extendible arm 704 in proximity to the bead roller 302. The actuation mechanism 514 may be any suitable mechanism for driving axial extension and retraction of the extendible arm 704, any may include, for example, a pneumatic or hydraulically driven cylinder.

Figure 17:
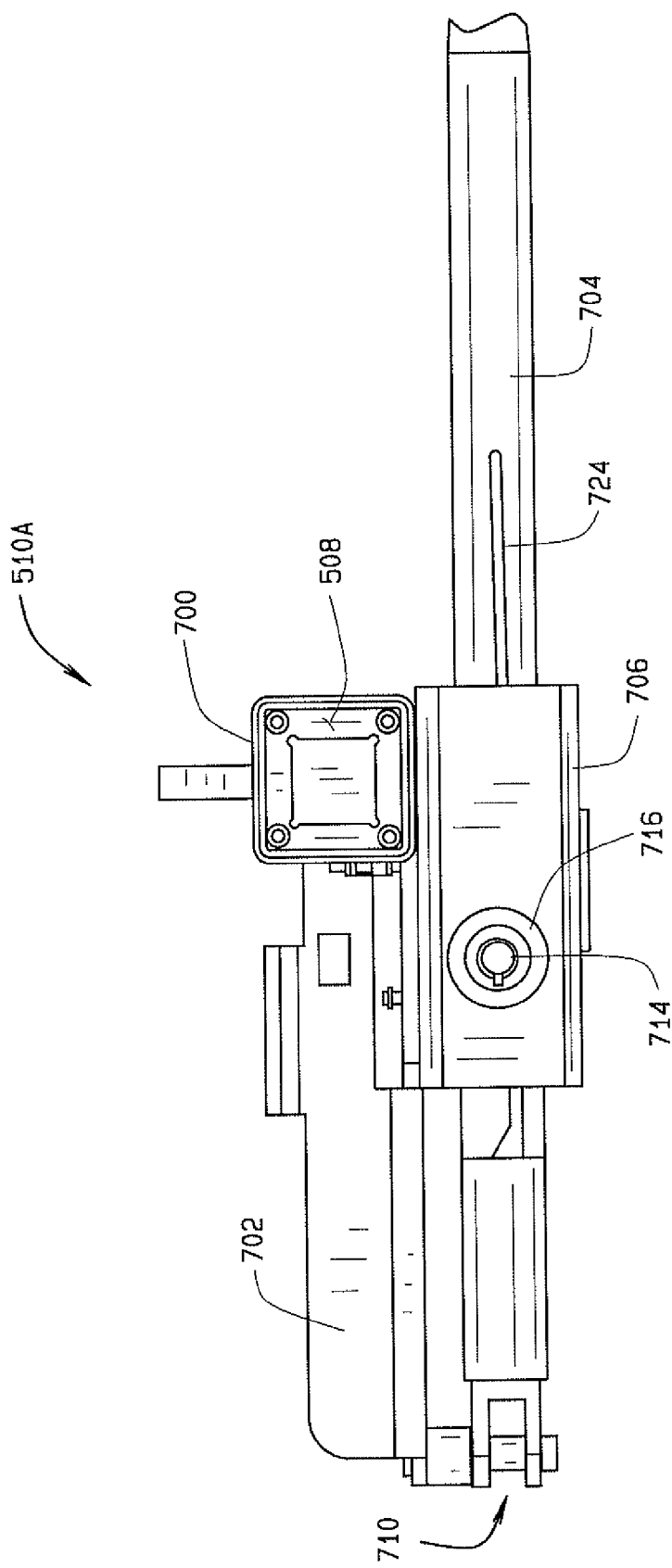
FIG. 17 is a bottom plan view of the automated bead breaker arm of FIG. 14.
Figure 18:
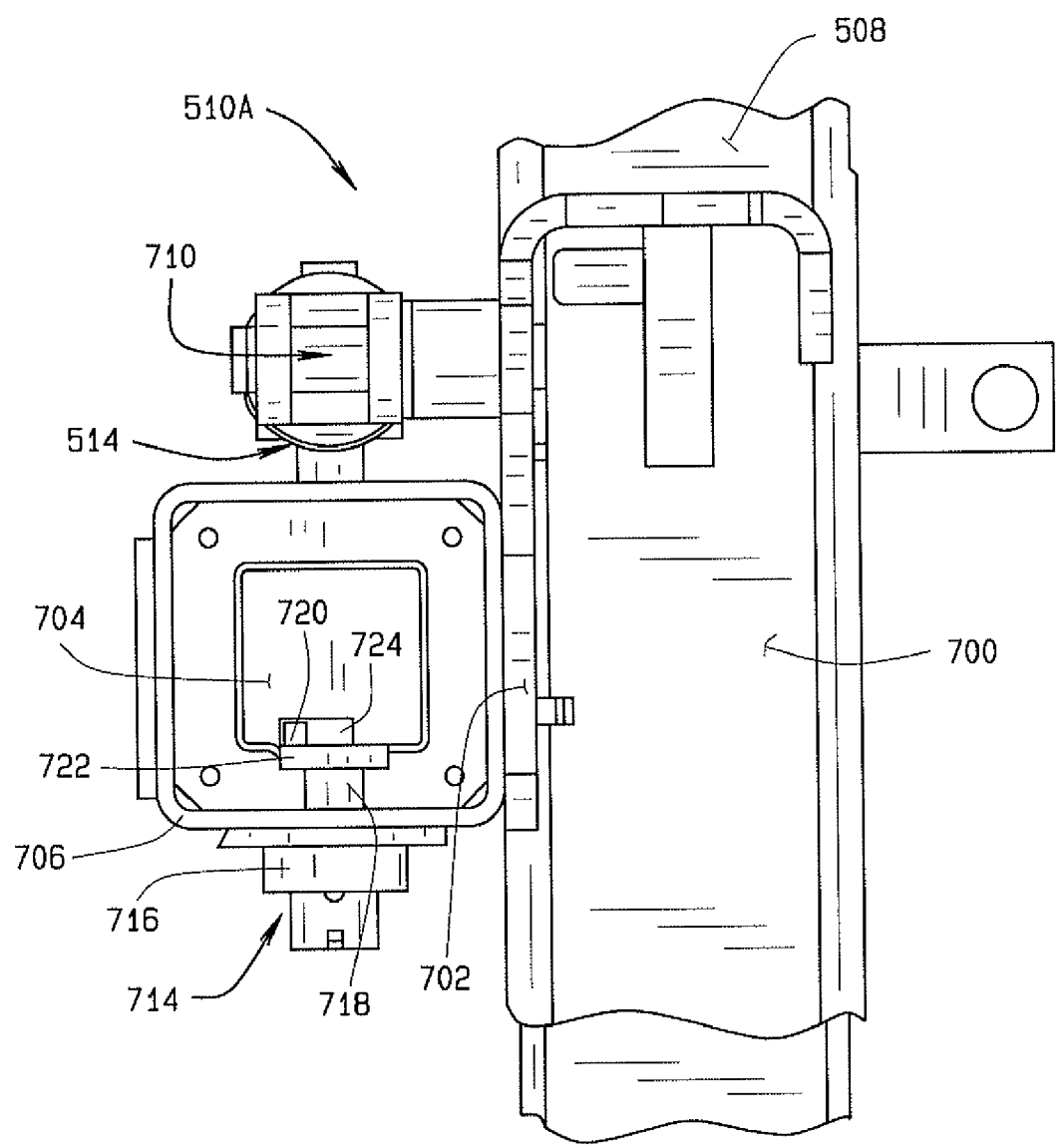
FIG. 18 is a back end view of the automated bead breaker arm of FIG. 14.
Figure 19:
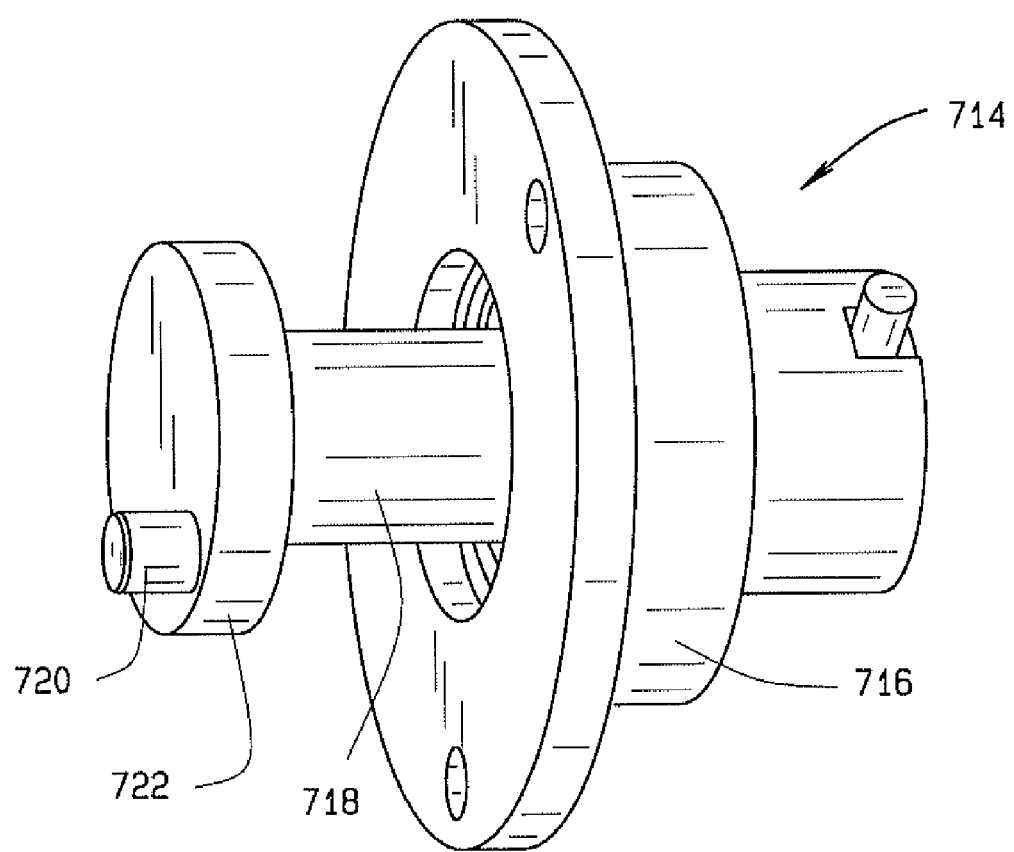
FIG. 19 is a perspective illustration of rotational movement sensor utilized for monitoring extension and retraction of the automated bead breaker arm of FIG. 14.

To monitor the extension position of the extendible arm 704, and correspondingly, the horizontal position of the bead roller 302, a sensor capable of measuring the extension and retraction of the actuation mechanism 514 may be incorporated therein, or a separate suitable sensor may secured to the housing framework 702 in operative proximity to the extendible arm 704. For example, as seen in FIGS. 17 through 19, a rotary encoder sensor 714, consisting of a sensor housing 716, a rotating shaft 718, and a offset engagement pin 720 coupled to an plate 722 at the distal end of the rotating shaft may be disposed in the sleeve 706, and engaged with the extendible arm 704. Specifically, with the sensor housing 716 secured in a fixed position on the sleeve 706, the rotating shaft extends towards the extendible arm 704, such that the offset engagement pin 720 seats within an angled slot 724 in an external surface of the extendible arm 704. Extension or retraction of the extendible arm 704 results is translated into rotary movement of the rotating shaft 718 of the rotary encoder sensor 714 by the interaction of the offset engagement pin and the angled slot 724, enabling the sensor 714 to provide an output signal which is representative of the horizontal extension position of the arm 704.

Those of ordinary skill in the art will recognize that similar suitable sensors may be associated with the sliding member 700 to provide an output signal which is representative of the vertical position of the arm 704 relative to the tool support shaft 508, and that if the tire bead removal arm 510A is configured for rotational movement about the vertical axis of the tool support shaft 508, an at least one additional sensor is required to fully determine the spatial position of the bead roller 302.

Output signals from the various position sensors associated with the tire bead removal arm 510A (and 510B) are communicated via any suitable means to the CPU 432, and may be subsequently utilized in a close-loop feedback system for automated articulation and positioning of the bead roller 302.

Preferably, sufficient sensors are disposed in the various tire service tools on the vehicle tire changing system 400 or 500 to provide at least positional information associated with movement along both at least one horizontal axis and at least one vertical axis. These tire service tools may include, but are not limited to a tire bead breaker assembly including an upper bead breaker and a lower bead breaker, or a mount/demount tool for operatively engaging the vehicle wheel assembly to facilitate mounting/demounting a tire from the wheel rim, each of which is configured for automated movement to operatively engage the wheel assembly.

The CPU 432 is configured to process the positional information from the various sensors in order to identify the spatial location of the various tire service tools relative to each other. The CPU 432 is further configured to utilize positional and dimensional information associated with a wheel assembly 118 undergoing a service procedure, acquired either via suitable imaging sensors, data set arm movement, or manual input, together with the positional information from the various sensors associated with the tire service tools in order to identify the spatial location of the various tire service tools relative to the wheel assembly 118.

The present invention can be embodied in-part in the form of computer-implemented processes and apparatuses for practicing those processes. The present invention can also be embodied in-part in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in-part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. An improved vehicle tire changing system having a processing unit, a support structure to secure a vehicle wheel assembly during a vehicle tire changing procedure, and an actuated tire service tool for operatively engaging a secured vehicle wheel assembly, the improvement comprising:
   a sensor assembly configured to acquire spatial position data, said sensor assembly operatively coupled to the processing unit for communicating said spatial position data thereto;
   wherein said sensor assembly includes an imaging sensor disposed to acquire spatial position data in the form of at least one optical image of either a surface region of the vehicle wheel rim or an actuated tire service tool; and
   wherein the processing unit is configured to utilize said communicated spatial position data to control automated movement of the actuated tire service tool.

2. The improved vehicle tire changing system of claim 1 wherein the actuated tire service tool includes at least one tire bead removal arm supporting a tire bead roller for operatively engaging the vehicle wheel assembly to displace a tire from the wheel rim, and wherein said imaging sensor assembly is disposed on said at least one tire bead removal arm.

3. The improved vehicle tire changing system of claim 1 wherein said imaging sensor is disposed in a stationary location with a stable field of view.

4. The improved vehicle tire changing system of claim 3 wherein said imaging sensor is associated with an optical energy source, said optical energy source disposed in a stationary location to emit illuminating optical energy.

5. The improved vehicle tire changing system of claim 1 wherein said processing unit is configured to utilize said communicated spatial position data to control automated movement of the actuated tire service tool responsive to wheel assembly features observed in said at least one optical image during a wheel assembly operation including, but not limited to, tire removal from a secured vehicle wheel assembly.

6. An improved vehicle tire changing system having a processing unit, a support structure to secure a vehicle wheel assembly during a vehicle tire changing procedure, and an actuated tire service tool for operatively engaging a secured vehicle wheel assembly, the improvement comprising:
   a sensor assembly configured to acquire spatial position data, said sensor assembly operatively coupled to the processing unit for communicating said spatial position data thereto;
   wherein said sensor assembly includes a dataset arm having a contact probe and configured with a range of movement sufficient to position said contact probe in contact with a surface on the vehicle wheel assembly;
   a plurality of sensors associated with said dataset arm, said sensors configured to provide output signals associated with a position of said dataset arm within said range of movement;
   wherein said communicated spatial position data includes at least one position of said dataset arm contact probe identified from said output signals; and
   wherein the processing unit is configured to utilize said communicated spatial position data to control automated movement of the actuated tire service tool.

7. An improved vehicle tire changing system having a processing unit, a support structure to secure a vehicle wheel assembly during a vehicle tire changing procedure, and an actuated tire service tool for operatively engaging a secured vehicle wheel assembly, the improvement comprising:
   an sensor assembly configured to acquire spatial data associated with a vehicle wheel assembly secured to the support structure, said sensor assembly operatively coupled to the processing unit for communicating said spatial data thereto; and
   wherein said processing unit is configured to utilize said communicated spatial data associated said vehicle wheel assembly to automate movement of the actuated tire service tool.

8. The improved vehicle tire changing system of claim 7 wherein the processing unit is further configured to utilize said spatial position data to alter a configuration of at least one component of the improved vehicle tire changing system.

9. The improved vehicle tire changing system of claim 8 wherein the processing unit is configured to alter the configuration of at least one component of the improved vehicle tire changing system during a vehicle tire changing procedure.

10. The improved vehicle tire changing system of claim 7 wherein the actuated tire service tool is a tire mount/demount tool for operatively engaging the vehicle wheel assembly to facilitate mounting/demounting a tire from the wheel rim, and wherein said automated movement controlled by said processing unit positions said tire mount/demount tool to facilitate mounting/dismounting said tire from said wheel rim.

11. The improved vehicle tire changing system of claim 7 further including a second sensor assembly associated with said actuated tire service tool, said sensor assembly configured to acquire data associated with the position of said actuated tire service tool, and operatively coupled to the processing unit for communicating said position data thereto; and
   wherein said processing unit is further configured to utilize said communicated position data together with said communicated spatial data to automate movement of the actuated tire service tool.

12. The improved vehicle tire changing system of claim 11 wherein said processing unit is configured to automate movement of the actuated tire service tool to operatively engage the vehicle wheel assembly secured to said support structure.

13. The improved vehicle tire changing system of claim 7 wherein said processing unit is configured to automate movement of the actuated tire service tool to a desired spatial location.

14. The improved vehicle tire changing system of claim 13 wherein said desired spatial location is selected to enable said actuated tire service tool to operatively engage a vehicle wheel assembly.

15. An improved vehicle tire changing system having a processing unit, a support structure to secure a vehicle wheel assembly during a vehicle tire changing procedure, and an actuated tire service tool for operatively engaging a secured vehicle wheel assembly, the improvement comprising:
   a sensor assembly configured to acquire spatial position data, said sensor assembly operatively coupled to the processing unit for communicating said spatial position data thereto;
   wherein the processing unit is configured to utilize said communicated spatial position data to control automated movement of the actuated tire service tool; and
   wherein the actuated tire service tool is a pair of tire bead removal arms each supporting a tire bead roller for operatively engaging the vehicle wheel assembly to displace a tire from the wheel rim, and wherein said automated movement controlled by said processing unit includes positioning each of said tire bead removal arms such that said associated tire bead rollers operatively engage the vehicle wheel assembly to facilitate dismounting said tire from said wheel rim.

16. An improved vehicle tire changing system having a processing unit, a support structure to secure a vehicle wheel assembly during a vehicle tire changing procedure, and an actuated tire service tool for operatively engaging a secured vehicle wheel assembly, the improvement comprising:
   a first sensor assembly configured to acquire position data associated with the position of said actuated tire service tool, and operatively coupled to the processing unit for communicating said position data thereto;
   a second sensor assembly configured to acquire spatial data associated with a vehicle wheel assembly secured to the support structure, said additional sensor assembly operatively coupled to the processing unit for communicating said spatial data thereto;
   wherein said processing unit is configured to utilize said communicated position data associated with said actuated tire service tool and said vehicle wheel assembly to automate movement of the actuated tire service tool.

17. The improved vehicle tire changing system of claim 16 wherein said first sensor assembly is configured to acquire position data representative of movement along at least a vertical axis and along at least a horizontal axis associated with said actuated tire service tool.

18. The improved vehicle tire changing system of claim 16 wherein said first sensor assembly and said second sensor assembly each include at least one sensor selected from a set of sensors including a potentiometer, a hall effect sensor, a rotary encoder, an optical slide, a magnetic slide, and LVDT, or a resistive sensor.

19. An improved vehicle tire changing system having a processing unit, a support structure to secure a vehicle wheel assembly during a vehicle tire changing procedure, and an actuated tire service tool for operatively engaging a secured vehicle wheel assembly, the improvement comprising:
   a sensor assembly configured to acquire position data associated with the position of said actuated tire service tool, and operatively coupled to the processing unit for communicating said position data thereto;
   an operator interface operatively coupled to the processing unit for receiving information from an operator;
   wherein said processing unit is configured to identify a desired spatial location, to which to move the actuated tire service tool to, from information received from the operator through said operator interface; and
   wherein said processing unit is further configured to utilize said sensor assembly communicated position data associated with said actuated tire service tool to automate movement of the actuated tire service tool to said desired spatial location.

20. The improved vehicle tire changing system of claim 19 wherein said received information includes dimensional data associated with the wheel assembly.

21. A method for automating an operation of a vehicle tire changing system having a processing unit, a support structure to secure a vehicle wheel assembly during a vehicle tire changing procedure, and an actuated tire service tool for operatively engaging a secured vehicle wheel assembly including at least a wheel rim secured by the vehicle tire changing system during service of a vehicle wheel assembly, comprising the steps of:
   acquiring position data associated with the actuated tire service tool for operatively engaging the secured vehicle wheel assembly;
   acquiring spatial position data associated with a feature of the secured vehicle wheel assembly;
   controlling movement of the actuated tire service tool to operatively engage the secured vehicle wheel assembly utilizing said acquired position data associated the actuated tire service tool and said acquired spatial position data associated with a feature of said secured vehicle wheel assembly.

22. The method of claim 21 wherein the step of controlling movement of the actuated tire service tool to operatively engage the secured vehicle wheel assembly utilizing said position data associated the actuated tire service tool is carried out during a vehicle tire changing procedure.

23. A method for automating an operation of a vehicle tire changing system having a processing unit, a support structure to secure a vehicle wheel assembly during a vehicle tire changing procedure, and an actuated tire service tool for operatively engaging a secured vehicle wheel assembly including at least a wheel rim secured by the vehicle tire changing system during service of a vehicle wheel assembly, comprising the steps of:
   acquiring position data associated with the actuated tire service tool for operatively engaging the secured vehicle wheel assembly;
   acquiring spatial position data associated with a feature of the secured vehicle wheel assembly; and
   controlling movement of the actuated tire service tool to operatively engage the secured vehicle wheel assembly utilizing said position data associated the actuated tire service tool and said spatial position data associated with said feature of the secured vehicle wheel assembly;
   wherein said step of acquiring spatial position data associated with said feature of the secured vehicle wheel assembly further includes
   detecting reflected optical energy from a surface area of the vehicle wheel assembly;
   generating an image of said surface area of the vehicle wheel assembly from said detected optical energy; and
   processing said generated image to extract positional data associated with said feature of the vehicle wheel assembly.

24. A method for automating an operation of a vehicle tire changing system having a processing unit, a support structure to secure a vehicle wheel assembly during a vehicle tire changing procedure, and an actuated tire service tool for operatively engaging a secured vehicle wheel assembly including at least a wheel rim secured by the vehicle tire changing system during service of a vehicle wheel assembly, comprising the steps of:
   acquiring position data associated with the actuated tire service tool for operatively engaging the secured vehicle wheel assembly;
   acquiring spatial position data associated with a feature of the secured vehicle wheel assembly; and
   controlling movement of the actuated tire service tool to operatively engage the secured vehicle wheel assembly utilizing said position data associated the actuated tire service tool and said spatial position data associated with said feature of the secured vehicle wheel assembly;
   wherein said step of acquiring spatial position data associated with said feature of the secured vehicle wheel assembly includes providing a dataset arm having a contact probe and configured with a range of movement sufficient to position said contact probe in contact with a surface on the vehicle wheel assembly;
   providing a plurality of sensors associated with said dataset arm, said sensors configured to provide output signals associated with a spatial position of said dataset arm within said range of movement;

positioning said dataset arm with said contact probe in contact with said feature of the secured vehicle wheel assembly;

acquiring said output signals from said plurality of sensors associated with said dataset arm during said positioning step; and processing said acquired output signals to acquiring spatial position data associated with said feature of the secured vehicle wheel assembly.

25. An improved vehicle tire changing system having a processing unit, a support structure to secure a vehicle wheel assembly during a vehicle tire changing procedure, and an actuated tire service tool for operatively engaging a secured vehicle wheel assembly, the improvement comprising:

a sensor assembly configured to acquire positional data, said sensor assembly operatively coupled to the processing unit for communicating said positional data thereto;

wherein the processing unit is configured to utilize said communicated positional data to control automated movement of the actuated tire service tool;

wherein the actuated tire service tool is at least one tire bead removal arm supporting a tire bead roller for operatively engaging the vehicle wheel assembly to displace a tire from the wheel rim; and wherein said automated movement controlled by said processing unit includes positioning said at least one tire bead removal arm such that said associated tire bead roller operatively engages the vehicle wheel assembly to facilitate dismounting said tire from said wheel rim.

26. An improved vehicle tire changing system having a processing unit, a support structure to secure a vehicle wheel assembly during a vehicle tire changing procedure, and an actuated tire service tool for operatively engaging a secured vehicle wheel assembly, the improvement comprising:

a sensor assembly configured to acquire positional data, said sensor assembly operatively coupled to the processing unit for communicating said positional data thereto;

wherein the processing unit is configured to utilize said communicated positional data to control automated movement of the actuated tire service tool during a tire mount/demount procedure; and wherein the actuated tire service tool is a mount/demount tool for operatively engaging the vehicle wheel assembly to facilitate mounting / demounting a tire from the wheel rim.

27. A method for operating a vehicle tire changing system having a processing unit, a support structure to secure a vehicle wheel assembly during a vehicle tire changing procedure, and an actuated tire service tool for operatively engaging a secured vehicle wheel assembly, comprising:

acquiring positional data associated with said actuated tire service tool;

communicating said acquired positional data to said processing unit;

processing said acquired positional data at said processing unit to determine a relationship between said actuated tire service tool and a vehicle wheel assembly secured to said support structure; and actuating said tire service tool in response to commands from said processing unit.

28. The method of claim 27 wherein said actuated tire service tool is at least one tire bead removal arm supporting a tire bead roller; and wherein the step of actuating said tire service tool positions the at least one tire bead removal arm such that said tire bead roller operatively engages the vehicle wheel assembly to displace a tire from the wheel rim so as to facilitate dismounting said tire from said wheel rim.

29. The method of claim 27 wherein said actuated tire service tool is a mount/demount tool; and wherein the step of actuating said tire service tool positions the mount/demount tool to operatively engage the vehicle wheel assembly to facilitate mounting / demounting a tire from the wheel rim.

* * * * *

UNITED STATES PATENT AND TRADEMARK OFFICE
CERTIFICATE OF CORRECTION

| | | |
|---|---|---|
| PATENT NO. | : 8,284,390 B1 | Page 1 of 1 |
| APPLICATION NO. | : 12/106441 | |
| DATED | : October 9, 2012 | |
| INVENTOR(S) | : Joel Clasquin et al. | |

It is certified that error appears in the above-identified patent and that said Letters Patent is hereby corrected as shown below:

Column 4, line 62; at the beginning of the line, after 130A, it reads "130B", it should read --130B--;
Column 4, at the end of the same line 62, after 128A, it reads "128B", it should read --128B--;

Column 8, line 46, after 510A and, it reads "510B", it should read --510B--;
Column 8, line 48, after 510A and, it reads "510B", it should read --510B--.

Signed and Sealed this
Fourth Day of December, 2012

David J. Kappos
*Director of the United States Patent and Trademark Office*

UNITED STATES PATENT AND TRADEMARK OFFICE
CERTIFICATE OF CORRECTION

PATENT NO.       : 8,284,390 B1
APPLICATION NO.  : 12/106441
DATED            : October 9, 2012
INVENTOR(S)      : Joel Clasquin et al.

Page 1 of 1

It is certified that error appears in the above-identified patent and that said Letters Patent is hereby corrected as shown below:

Claim 7, at Col. 12, line 10 reads "communicated spatial data associated said vehicle"

The line should read -- communicated spatial data associated with said vehicle --

Signed and Sealed this
Twelfth Day of February, 2013

Teresa Stanek Rea
*Acting Director of the United States Patent and Trademark Office*